(12) United States Patent
Yang et al.

(10) Patent No.: US 10,918,014 B2
(45) Date of Patent: Feb. 16, 2021

(54) FERTILIZATION PRECISION CONTROL METHOD FOR WATER AND FERTILIZER INTEGRATED EQUIPMENT AND CONTROL SYSTEM THEREOF

(71) Applicant: CAMCE WHU DESIGN & RESEARCH CO., LTD., Wuhan (CN)

(72) Inventors: Lin Yang, Wuhan (CN); Guangxing Wu, Wuhan (CN); Zhengguang Wu, Wuhan (CN); Tailai Li, Wuhan (CN); Chonghua Mao, Wuhan (CN)

(73) Assignee: CAMCE WHU DESIGN & RESEARCH CO., LTD., Wuhan (CN)

( * ) Notice: Subject to any disclaimer, the term of this patent is extended or adjusted under 35 U.S.C. 154(b) by 398 days.

(21) Appl. No.: 15/947,811

(22) Filed: Apr. 7, 2018

(65) Prior Publication Data
US 2019/0014717 A1  Jan. 17, 2019

(30) Foreign Application Priority Data

Jul. 11, 2017 (CN) .......................... 201710561751.4

(51) Int. Cl.
*A01C 23/04* (2006.01)
*G06N 3/12* (2006.01)
*A01C 23/00* (2006.01)
*A01B 79/00* (2006.01)

(52) U.S. Cl.
CPC .......... *A01C 23/007* (2013.01); *A01C 23/042* (2013.01); *G06N 3/126* (2013.01); *A01B 79/005* (2013.01)

(58) Field of Classification Search
CPC .... G01N 3/126; A01C 23/007; A01C 23/042; A01B 79/005
See application file for complete search history.

(56) References Cited

U.S. PATENT DOCUMENTS

| | | | |
|---|---|---|---|
| 10,317,326 B2 * | 6/2019 | Zuo | A01C 21/007 |
| 2004/0167721 A1 * | 8/2004 | Murakawa | G06N 3/126 |
| | | | 702/20 |
| 2018/0049364 A1 * | 2/2018 | Campisi-Pinto | G06F 17/40 |

OTHER PUBLICATIONS

Kim, H., et al. "Automated Sensing of Hydroponic Macronutrients Using a Computer-Controlled System with an Array of Ion-Selective Electrodes" Computers & Electronics in Agriculture, vol. 93, pp. 46-54 (2013) (Year: 2013).*

Ruan, J., et al. "The Design and Research on Intelligent Fertigation System" IEEE 7th Int'l Conf. on Intelligent Human-Machine Systems & Cybernetics, pp. 456-459 (2015) (Year: 2015).*

(Continued)

*Primary Examiner* — Jay Hann
(74) *Attorney, Agent, or Firm* — Dragon Sun Law Firm, PC; Jinggao Li, Esq.

(57) ABSTRACT

A fertilization precision control method for water and fertilizer integrated equipment and a control system thereof includes the following steps: step S1, establishing a fertilization precision control model of the water and fertilizer integrated equipment; and step S2, solving an optimal solution of the fertilization precision control model by adopting estimation of distribution algorithms.

3 Claims, 2 Drawing Sheets

Establish a fertilization precision control model of the water and fertilizer integrated equipment. — S1

Solve an optimal solution of the fertilization precision control model by adopting estimation of distribution algorithms. — S2

(56) References Cited

OTHER PUBLICATIONS

Liopa-Tsakalidi, A., et al. "Modelling the Richards function using Evolutionary Algorithms on the effect of electrical conductivity of nutrient solution on zucchini growth in hydroponic culture" Simulation Modeling Practice & Theory, vol. 18, pp. 1266-1273 (2010) (Year: 2010).*
Nazir, A., et al. "A Simplified Genetic Algorithm for Online Tuning of PID Controller in LabView" IEEE World Congress on Nature & Biologically Inspired Computing, pp. 1516-1519 (2009) (Year: 2009).*
Miao, L., et al. "An Algorithm of Fertilization Model Fitting Based On Mixed Intelligent Computation" IEEE Int'l Conf. on Advanced Computer Control, pp. 425-429 (2008) (Year: 2008).*
Land, M. "Evolutionary Algorithms with Local Search for Combinatorial Optimization" Dissertation, UC San Diego (1998) (Year: 1998).*

* cited by examiner

S1: Establish a fertilization precision control model of the water and fertilizer integrated equipment.

S2: Solve an optimal solution of the fertilization precision control model by adopting estimation of distribution algorithms.

FIG.1

FERTILIZATION PRECISION CONTROL METHOD FOR WATER AND FERTILIZER INTEGRATED EQUIPMENT AND CONTROL SYSTEM THEREOF

CROSS-REFERENCE TO RELATED APPLICATIONS

This application claims priority to Chinese Patent Application No. 201710561751.4 with a filing date of Jul. 11, 2017. The content of the aforementioned applications, including any intervening amendments thereto, are incorporated herein by reference.

TECHNICAL FIELD

The present invention relates to the technical field of automation management of agricultural production, and particularly relates to a fertilization precision control method for water and fertilizer integrated equipment and a control system thereof.

BACKGROUND OF THE PRESENT INVENTION

Control of fertilization precision is a main performance index of water and fertilizer integrated equipment. The water and fertilizer integrated equipment monitors the changes of values Electrical Conductivity (EC) and pH in a fertilizer mixing bucket by virtue of a detection circuit and further controls opening or closing of a fertilizer absorption channel, thereby controlling a fertilizer concentration in the fertilizer mixing bucket, wherein the fertilization precision of the equipment is directly influenced by a process of controlling fertilizer absorption of the equipment.

Generally, the water and fertilizer integrated equipment controls the fertilization precision by a time control method or a Proportional-Integral-Derivative (PID) control method. However, when the time control method is adopted, a fluctuation range of the EC value is wide; and when the PID control method is adopted, because of the structural delay of the data acquisition by a sensor and the delay of fertilizer absorption in the fertilizer absorption channel, the control precision is low.

SUMMARY OF PRESENT INVENTION

A technical problem to be solved in the present invention is to provide a fertilization precision control method for water and fertilizer integrated equipment and a control system thereof, so as to overcome the defects in the prior art.

A technical solution for solving the above technical problem in the present invention is as follows:

In one aspect, the present invention provides a fertilization precision control method for water and fertilizer integrated equipment, comprising the following steps:

S1: establishing a fertilization precision control model of the water and fertilizer integrated equipment; and S2, solving an optimal solution of the fertilization precision control model by adopting estimation of distribution algorithms.

The present invention has beneficial effects as follows: the estimation of distribution algorithms are combined with the fertilization precision control model of the water and fertilizer integrated equipment, thereby solving an optimal control process of enhancing control precision of the water and fertilizer integrated equipment; and compared with time control and PID control, the method proposed by the present invention increases the control precision of the equipment in a whole-process control manner while fully considering the influences caused by structural delay of the system, so that precision control of a fertilization concentration in the water and fertilizer integrated equipment is enhanced, and the performance of the water and fertilizer integrated equipment is improved.

Further, a specific implementation mode of the step S1 is as follows:

step S11: testing the water and fertilizer integrated equipment, and collecting fertilizer solution concentration values and corresponding time values thereof in a fertilizer mixing bucket in real time;

step S12: fitting the collected fertilizer solution concentration values and the corresponding time values thereof into a fertilizer solution concentration varying curve by adopting a least square method; and step S13: establishing a fertilization precision control model of the water and fertilizer integrated equipment according to the fertilizer solution concentration varying curve:

$$\begin{cases} f_t(x) = \begin{cases} U_{t-td}(x) + R_t & s = 1 \\ L_{t-td}(x) + R_t & s = 0 \end{cases} \\ \min\{\max|f_t(x) - \text{Set}|\} \quad t = 1, 2, 3, \ldots n \end{cases}$$

wherein $f_t(x)$ is the fertilizer solution concentration varying curve of the water and fertilizer integrated equipment, $U_{t-td}(x)$ is a varying curve when the fertilizer solution concentration is increased, $L_{t-td}(x)$ is a varying curve when the fertilizer solution concentration is decreased, t is a time sequence number, td is delay time of a structure and concentration monitoring sensor, $R_t$ is a random concentration fluctuation value, s represents whether a fertilization channel is opened or not, "s=1" represents that the fertilization channel is opened, "s=0" represents that the fertilization channel is closed, and Set represents a set fertilizer solution concentration value to be achieved.

The above further solution has beneficial effects as follows: the fertilizer solution concentration changes in a water and fertilizer integrated operation process are subjected to mathematical modeling, thereby facilitating solution of the algorithms.

Further, a specific implementation mode of the step S2 is as follows:

step S21: determining a solution of the fertilization precision control model to be $X=[x_1, x_2, x_3, \ldots, x_n]$, wherein $x_n$ is an opening or closing state of a fertilizer absorption channel at $n^{th}$ second and the set parameters of the estimation of distribution algorithms are as follows: a scale of population is N, a total generation number of population evolution is m and a number of searching times for local search of each generation of the population is a; setting b=0; and generating N individuals in a random manner to form an initial population P(b) under a condition that a non-negativity constraint of variables is met;

step S22: calculating a fitness value of each individual in the population P(b) by combining the fertilization precision control model, and sampling by adopting a Gauss distribution algorithm to generate a set which is composed of N individuals;

step S23: performing mutation operations on values of the individuals in the set, and generating a population P(b) of a next generation composed of N individuals, and setting b=b+1, q=0;

step S24: performing local search on each of the individuals in the population P(b), and generating a population P(b) of a third generation composed of N individuals, and setting q=q+1:

step S25: returning to the S24 if q is less than a, otherwise entering step S26; and step S26: returning to the S22 if b is less than m, otherwise outputting an optimal individual, as an optimal solution, in the population P(b) of the third generation.

The above further solution has beneficial effects as follows: a local search mechanism is introduced, so that searching performance of the algorithm is improved.

Further, a specific implementation mode of the step S22 is as follows:

step S221: calculating a fitness value of each individual in the population P(b) by combining the fertilization precision control model, and calculating mean parameters and variance parameters of the estimation of distribution algorithms according to the fitness values; and step S222: sampling through the Gauss distribution algorithm by combining the mean parameters and the variance parameters, and generating a set which is composed of N individuals.

The above further solution has beneficial effects as follows: the population is ensured to evolve into an optimal solution in an evolution process.

Further, a specific implementation mode of the step S23 is as follows:

respectively performing mutation operations on the value of each individual in the set, and replacing the individuals before mutation with individuals generated by mutation so as to generate a population P(b) of the next generation if the fitness values of the individuals generated by mutation are better than the fitness values of the individuals before mutation; and setting b=b+1, q=0.

The above further solution has beneficial effects as follows: an optimal solution of a control process of controlling fertilizer solution concentration change by the water and fertilizer integrated equipment is solved by combining the estimation of distribution algorithms and the model.

In another aspect, the present invention provides a fertilization precision control system for water and fertilizer integrated equipment, comprising a model establishing module and a model solving module.

The model establishing module is used for establishing a fertilization precision control model of the water and fertilizer integrated equipment.

The model solving module is used for solving an optimal solution of the fertilization precision control model by adopting estimation of distribution algorithms.

The present invention has beneficial effects as follows: the estimation of distribution algorithms are combined with the fertilization precision control model of the water and fertilizer integrated equipment, thereby solving an optimal control process of enhancing control precision of the water and fertilizer integrated equipment; and compared with time control and PID control, the method proposed by the present invention increases the control precision of the equipment in a whole-process control manner while fully considering the influences caused by structural delay of the system, so that precision control of the fertilization concentration in the water and fertilizer integrated equipment is enhanced, and the performance of the water and fertilizer integrated equipment is improved.

Further, the model establishing module comprises a data collecting unit, a data processing unit and a model establishing unit.

The data collecting unit is used for collecting fertilizer solution concentration values and corresponding time values thereof in a fertilizer mixing bucket in real time while testing the water and fertilizer integrated equipment.

The data processing unit is used for fitting the collected fertilizer solution concentration values and the corresponding time values thereof into a fertilizer solution concentration varying curve by adopting a least square method.

The model establishing unit is used for establishing a fertilization precision control model of the water and fertilizer integrated equipment according to the fertilizer solution concentration varying curve:

$$\begin{cases} f_t(x) = \begin{cases} U_{t-td}(x) + R_t & s = 1 \\ L_{t-td}(x) + R_t & s = 0 \end{cases} \\ \min\{\max|f_t(x) - \text{Set}|\} \quad t = 1, 2, 3, \ldots n \end{cases}$$

wherein $f_t(x)$ is the fertilizer solution concentration varying curve of the water and fertilizer integrated equipment, $U_{t-td}(x)$ is a varying curve when the fertilizer solution concentration is increased, $L_{t-td}(x)$ is a varying curve when the fertilizer solution concentration is decreased, t is a time sequence number, td is delay time of a structure and concentration monitoring sensor. $R_t$ is a random concentration fluctuation value, s represents whether a fertilization channel is opened or not, "s=1" represents that the fertilization channel is opened, "s=0" represents that the fertilization channel is closed, and Set represents a set fertilizer solution concentration value to be achieved.

The above further solution has beneficial effects as follows: the fertilizer solution concentration changes in the water and fertilizer integrated operation process are subjected to mathematical modeling, thereby facilitating solution of the algorithms.

Further, the model solving module comprises an initialization unit, a first update unit, a second update unit, a local search unit and a judgment unit.

The initialization unit is used for determining a solution of the fertilization precision control model to be $X=[x_1, x_2, x_3, \ldots, x_n]$, wherein $x_n$ is an opening or closing state of a fertilizer absorption channel at nth second and the set parameters of the estimation of distribution algorithms are as follows: a scale of population is N, a total generation number of population evolution is m and a number of searching times for local search of each generation of the population is a; setting b=0; and generating N individuals in a random manner to form an initial population P(b) under a condition that a non-negativity constraint of variables is met.

The first update unit is used for calculating a fitness value of each individual in the population P(b) by combining the fertilization precision control model, and sampling by adopting a Gauss distribution algorithm to generate a set which is composed of N individuals.

The second update unit is used for performing mutation operations on values of the individuals in the set, and generating a population P(b) of a next generation composed of N individuals, and setting b=b+1, q=0.

The local search unit is used for performing local search on each of the individuals in the population P(b), and generating a population P(b) of a third generation composed of N individuals, and setting q=q+1.

The judgment unit is used for outputting an optimal individual, as an optimal solution, in the population P(b) of the third generation under a termination condition.

The above further solution has beneficial effects as follows: a local search mechanism is introduced, so that searching performance of the algorithm is improved.

Further, the first update unit comprises a calculation subunit and a set generation subunit.

The calculation subunit is used for calculating a fitness value of each individual in the population P(b) by combining the fertilization precision control model, and calculating mean parameters and variance parameters of the estimation of distribution algorithms according to the fitness values.

The set generation subunit is used for sampling through the Gauss distribution algorithm by combining the mean parameters and the variance parameters, and generating a set which is composed of N individuals.

The above further solution has beneficial effects as follows: the population is ensured to evolve into an optimal solution in an evolution process.

Further, the second update unit is used for respectively performing mutation operations on the value of each individual in the set, and replacing the individuals before mutation with individuals generated by mutation so as to generate a population P(b) of the next generation if the fitness values of the individuals generated by mutation are better than the fitness values of the individuals before mutation; and setting b=b+1, q=0.

The above further solution has beneficial effects as follows: an optimal solution of a control process of controlling the fertilizer solution concentration change by the water and fertilizer integrated equipment is solved by combining the estimation of distribution algorithms and the model.

DESCRIPTION OF THE DRAWINGS

FIG. 1 is a flow chart of a fertilization precision control method for water and fertilizer integrated equipment.

DETAILED DESCRIPTION OF PREFERRED EMBODIMENTS

Figure 2:
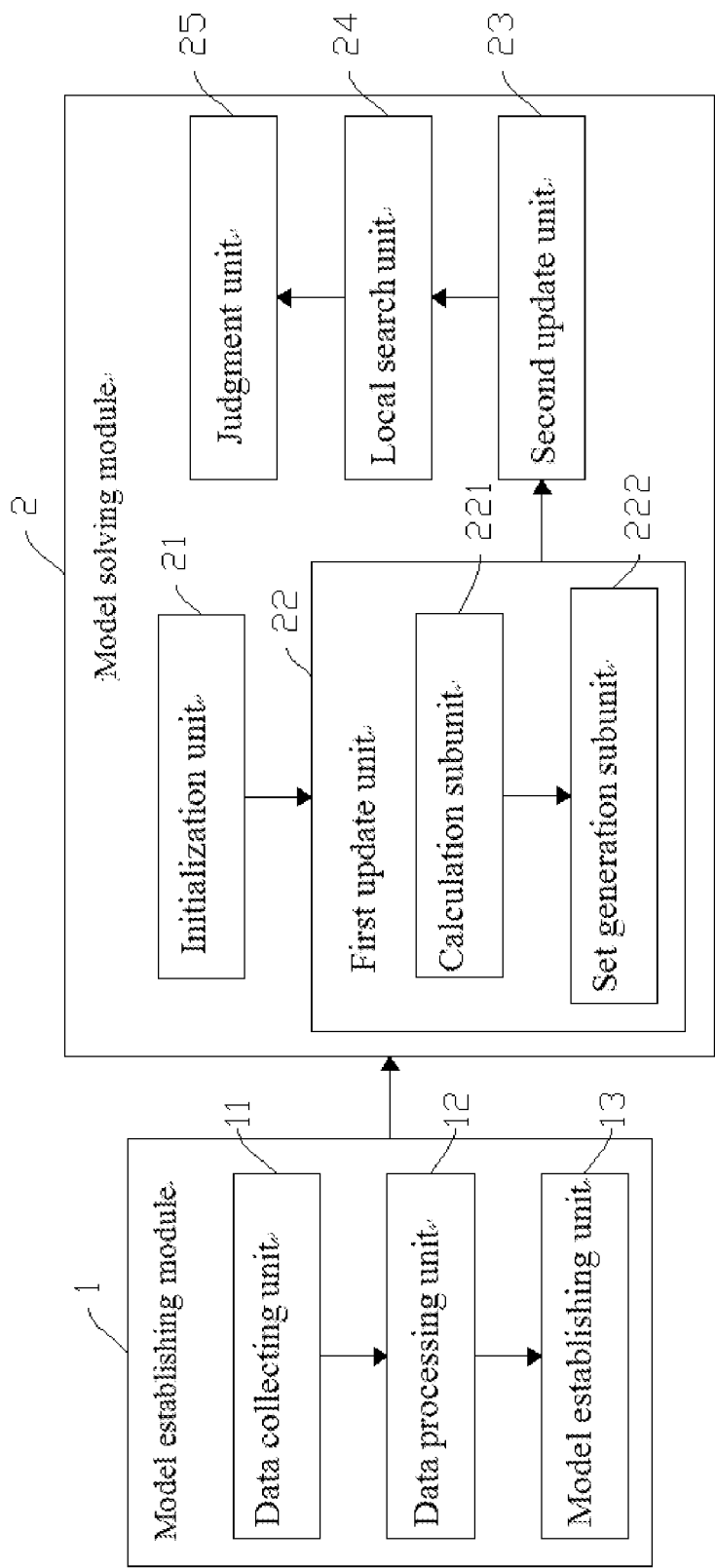
FIG. 2 is a principle block diagram of a fertilization precision control system for water and fertilizer integrated equipment.

Principles and features of the present invention are described below. Illustrated embodiments are used for explaining the present invention only, rather than limiting a scope of the present invention.

Embodiment 1

As shown in FIG. 1, a fertilization precision control method for water and fertilizer integrated equipment comprises the following steps:

step S1: establishing a fertilization precision control model of the water and fertilizer integrated equipment; and step S2, solving an optimal solution of the fertilization precision control model by adopting estimation of distribution algorithms.

Further, a specific implementation mode of the step S1 is as follows:

step S11: testing the water and fertilizer integrated equipment, and collecting fertilizer solution concentration values and corresponding time values thereof in a fertilizer mixing bucket in real time;

step S12: fitting the collected fertilizer solution concentration values and the corresponding time values thereof into a fertilizer solution concentration varying curve by adopting a least square method; and step S13: establishing a fertilization precision control model of the water and fertilizer integrated equipment according to the fertilizer solution concentration varying curve:

$$\begin{cases} f_t(x) = \begin{cases} U_{t-td}(x) + R_t & s = 1 \\ L_{t-td}(x) + R_t & s = 0 \end{cases} \\ \min\{\max|f_t(x) - \text{Set}|\} \quad t = 1, 2, 3, \ldots n \end{cases}$$

wherein $f_t(x)$ is the fertilizer solution concentration varying curve of the water and fertilizer integrated equipment, $U_{t-td}(x)$ is a varying curve when the fertilizer solution concentration is increased, $L_{t-td}(x)$ is a varying curve when the fertilizer solution concentration is decreased, t is a time sequence number, td is delay time of a structure and concentration monitoring sensor, $R_t$ is a random concentration fluctuation value, s represents whether a fertilization channel is opened or not. "s=1" represents that the fertilization channel is opened, and "s=0" represents that the fertilization channel is closed. In the formula, Set represents a set fertilizer solution concentration value to be achieved (i.e., a preset fertilizer solution concentration value); in an operation process of a formula $\min\{\max|f_t(x)-\text{Set}|\}$ t=1, 2, 3, . . . n, the maximum difference between the fertilizer solution concentration varying curve $f_t(x)$ and a set fertilizer solution concentration curve is minimal, i.e., fertilizer solution concentration fluctuation in the operation process is minimal.

According to the above manner, the fertilizer solution concentration changes in a water and fertilizer integrated operation process are subjected to mathematical modeling, thereby facilitating solution of the algorithms.

In the water and fertilizer integrated equipment, the fertilizer concentration changes in the fertilizer mixing bucket are divided into two stages. When the fertilizer absorption channel is opened, the concentration in the fertilizer mixing bucket is on the increase; and when the fertilizer absorption channel is closed, the fertilizer solution concentration in the fertilizer mixing bucket begins to decrease. In a starting operation process of the water and fertilizer integrated equipment, a starting stage and a stabilization stage should be experienced. At the starting stage, since the fertilizer absorption channel is always in an opened state, the fertilizer solution concentration is at an increase stage; and at the stabilization stage, due to the presence of delay of structure and monitoring channels and a random fluctuation value, the fertilizer absorption channel is in a frequently opened and closed state. The significance of the water and fertilizer integrated precision control model is that: the concentration fluctuation range is minimal in a process of solving a set concentration achieved by the water and fertilizer integrated equipment.

Further, a specific implementation mode of the step S2 is as follows:

step S21: determining a solution of the fertilization precision control model to be $X=[x_1, x_2, x_3, \ldots, x_n]$, wherein $x_n$ is an opening or closing state of a fertilizer absorption channel at nth second; herein the solution is defined in advance in a variable manner, thereby bringing convenience for performing subsequent algorithms; and the set parameters of the estimation of distribution algorithms are as follows: a scale of population is N, a total generation number of population evolution is m and a number of searching times for local search of each generation of the population is a; setting b=0; and generating N individuals in a random manner to form an initial population P(b) under a condition that a non-negativity constraint of variables is met, wherein b is a number of evolutionary generations of the population; and in the present embodiment, the scale N of the population is set as 100, the total generation number m of population evolution is set as 500, and the number a of searching times for local search of each generation of the population is set as 20;

step S22: calculating a fitness value of each individual in the population P(b) by combining the fertilization precision control model, and sampling by adopting a Gauss distribution algorithm to generate a set which is composed of N individuals;

step S23: performing mutation operations on values of the individuals in the set, and generating a population P(b) of a next generation composed of N individuals, and setting b=b+1, q=0;

step S24: performing local search on each of the individuals in the population P(b), and generating a population P(b) of a third generation composed of N individuals, and setting q=q+1, wherein the step of performing local search on each of the individuals in the population P(b) is to perform local search on each value in each of the individuals in the population P(b), i.e., to perform the mutation operation on the values $x_1, x_2, x_3, \ldots x_n$ sequentially; the mutation operation is to change the selected value $x_n$; if the value $x_n$ is 1, the value is changed to 0, and if the value $x_n$ is 0, the value is changed to 1; if a change rate of the obtained fertilization concentrations of a water and fertilizer machine is improved while calculating the fitness values of the individuals generated by local search, the individuals obtained by the local search are reserved and put into the population P(b) of the third generation; otherwise the individuals before the local search are put into the population P(b) of the third generation. Since the significance of the water and fertilizer integrated precision control model is that the concentration fluctuation range is minimal in the process of solving the set concentration achieved by the water and fertilizer integrated equipment. i.e., a solving significance of the formula $\min\{\max|f_t(x)-\text{Set}|\}$ t=1, 2, 3, . . . n, the improvement of the change rate of the water and fertilizer concentration means that the fitness values of the individuals generated by the local search are less than the fitness values of the individuals before the local search;

step S25: returning to the step S24 if q is less than a, otherwise entering step S26, so as to ensure that the set number of searching times for local search of each generation of the population is completed; and step S26: returning to the step S22 if b is less than m, otherwise outputting an optimal individual, as an optimal solution, in the population P(b) of the third generation. Herein, output of the optimal individual in the population P(b) of the third generation is to output an individual with the minimum fitness value in the population P(b) of the third generation. The set total generation number of the population is ensured to be completed.

Through the above manner, a local search mechanism is introduced, so that searching performance of the algorithm is improved.

After the set total generation number of the population and the number of searching times for local search of each generation of the population are completed, the obtained individuals in the population are convergent to the optimal solution, and then all the individuals in the population are approximately equal. Therefore, the optimal individual (the individual with the minimum fitness value) in the population may be taken as a globally optimal solution obtained in the algorithm.

Further, a specific implementation mode of the step S22 is as follows:

step S221: calculating a fitness value of each individual in the population P(b) by combining the fertilization precision control model, and calculating mean parameters and variance parameters of the estimation of distribution algorithms according to the fitness values, wherein specifically, a calculation formula of the fitness value is $\max|f_t(x)-\text{Set}|$, a calculation formula of the mean parameters $x_i$, $x_i$ is the mean value of individuals of which the fitness values rank at top 50% in the population in the $i^{th}$ dimension, and the variance parameters are variances obtained by calculation; and step S222: sampling through the Gauss distribution algorithm by combining the mean parameters and the variance parameters, and generating a set composed of N individuals. Herein, sampling is performed in a random manner, so that distribution of a set obtained by sampling satisfies Gaussian distribution; additionally, since the solution adopted in the present invention is in a state 0-1, the obtained sampling individual values should be rounded off to become to 0 or 1 and then to form a set; and through the above manner, the population is ensured to evolve into an optimal solution in an evolution process.

Further, a specific implementation mode of the step S23 is as follows:

respectively performing a mutation operation on the value of each individual in the set, wherein the mutation operation herein is to change the selected value $x_n$ in the individuals of the set, i.e., to vary the selected value $x_n$; if the value $x_n$ is 1, the value is changed to 0, and if the value $x_n$ is 0, the value is changed to 1; herein, the selected values of the individuals are random and unidirectional when the values of the individuals are subjected to the mutation operations, so that the population is diversified; and replacing the individuals before mutation with individuals generated by mutation so as to generate a population P(b) of the next generation if the fitness values of the individuals generated by mutation are better than the fitness values of the individuals before mutation; and setting b=b+1, q=0. Herein, the fitness values of the individuals generated by mutation are better than the fitness values of the individuals before mutation, which means that the fitness values of the individuals generated by mutation are less than the fitness values of the fitness values of the individuals before mutation.

Through the above manner, by combining the estimation of distribution algorithms and the model, an optimal solution of a control process for controlling a fertilizer solution concentration change by the water and fertilizer integrated equipment is solved.

Embodiment 2

As shown in FIG. 2, a fertilization precision control system for water and fertilizer integrated equipment comprises a model establishing module 1 and a model solving module 2.

The model establishing module 1 is used for establishing a fertilization precision control model of the water and fertilizer integrated equipment.

The model solving module 2 is used for solving an optimal solution of the fertilization precision control model by adopting estimation of distribution algorithms.

Further, the model establishing module 1 comprises a data collecting unit 11, a data processing unit 12 and a model establishing unit 13.

The data collecting unit 11 is used for collecting fertilizer solution concentration values and corresponding time values thereof in a fertilizer mixing bucket in real time while testing the water and fertilizer integrated equipment.

The data processing unit 12 is used for fitting the collected fertilizer solution concentration values and the corresponding time values thereof into a fertilizer solution concentration varying curve by adopting a least square method.

The model establishing unit 13 is used for establishing a fertilization precision control model of the water and fertilizer integrated equipment according to the fertilizer solution concentration varying curve:

$$\begin{cases} f_t(x) = \begin{cases} U_{t-td}(x) + R_t & s = 1 \\ L_{t-td}(x) + R_t & s = 0 \end{cases} \\ \min\{\max|f_t(x) - \text{Set}|\} \quad t = 1, 2, 3, \ldots n \end{cases}$$

wherein $f_t(x)$ is the fertilizer solution concentration varying curve of the water and fertilizer integrated equipment, $U_{t-td}(x)$ is a varying curve when the fertilizer solution concentration is increased, $L_{t-td}(x)$ is a varying curve when the fertilizer solution concentration is decreased, t is a time sequence number, td is delay time of a structure and concentration monitoring sensor, $R_t$ is a random concentration fluctuation value, s represents whether a fertilization channel is opened or not, "s=1" represents that the fertilization channel is opened, "s=0" represents that the fertilization channel is closed. In the formula, Set represents a set fertilizer solution concentration value to be achieved (that is, a preset fertilizer solution concentration value); in an operation process of a formula $\min\{\max|f_t(x)-\text{Set}|\}$ t=1, 2, 3, ... n, the maximum difference between the fertilizer solution concentration curve $f_t(x)$ and a set fertilizer solution concentration varying curve is minimal, i.e., fertilizer solution concentration fluctuation in the operation process is minimal.

Through the above manner, the fertilizer solution concentration changes in the water and fertilizer integrated operation process are subjected to mathematical modeling, thereby facilitating solution of the algorithms.

Further, the model solving module 2 comprises an initialization unit 21, a first update unit 22, a second update unit 23, a local search unit 24 and a judgment unit 25.

The initialization unit 21 is used for determining a solution of the fertilization precision control model to be $X=[x_1, x_2, x_3, \ldots, x_n]$, wherein $x_n$ is an opening or closing state of a fertilizer absorption channel at nth second; the set parameters of the estimation of distribution algorithms are as follows: a scale of population is N, a total generation number of population evolution is m and a number of searching times for local search of each generation of the population is a; setting b=0; and generating N individuals in a random manner to form an initial population P(b) under a condition that a non-negativity constraint of variables is met, wherein b is a number of evolutionary generations of the population; and in the present embodiment, the scale N of the population is set as 100, the total generation number m of population evolution is set as 500, and the number a of searching times for local search of each generation of the population is set as 20.

The first update unit 22 is used for calculating a fitness value of each individual in the population P(b) by combining the fertilization precision control model, and sampling by adopting a Gauss distribution algorithm to generate a set which is composed of N individuals.

The second update unit 23 is used for performing mutation operations on values of the individuals in the set, and generating a population P(b) of a next generation composed of N individuals, assuming b=b+1, q=0.

The local search unit 24 is used for performing local search on each of the individuals in the population P(b), and generating a population P(b) of a third generation composed of N individuals, and setting q=q+1; the step of performing local search on each of the individuals in the population P(b) is to perform local search on each value in each of the individuals in the population P(b), i.e., to perform the mutation operation on the values $x_1, x_2, x_3, \ldots x_n$ sequentially; the mutation operation is to change the selected value $x_n$; if the value $x_n$ is 1, the value is changed to 0, and if the value $x_n$ is 0, the value is changed to 1; if a change rate of the obtained fertilization concentrations of a water and fertilizer machine is improved while calculating the fitness values of the individuals generated by local search, the individuals obtained by the local search are reserved and put into the population P(b) of the third generation; otherwise the individuals before the local search are put into the population P(b) of the third generation. Since the significance of the water and fertilizer integrated precision control model is that the concentration fluctuation range is minimal in the process of solving the set concentration achieved by the water and fertilizer integrated equipment, i.e., the solving significance of the formula $\min\{\max|f_t(x)-\text{Set}|\}$ t=1, 2, 3, ... n, the improvement of the change rate of the water and fertilizer concentration means that the fitness values of the individuals generated by the local search are less than the fitness values of the individuals before the local search.

The judgment unit 25 is used for outputting an optimal individual, as an optimal solution, in the population P(b) of the third generation when a termination condition is satisfied, wherein the termination condition means that the number of evolutionary generations of the population reaches a preset total generation number of population evolution and the number of searching times for local search of each generation of the population reaches a preset number of searching times for local search of each generation of the population; and herein, output of the optimal individual in the population P(b) of the third generation is to output an individual with the minimum fitness value in the population P(b) of the third generation.

Through the above manner, a local search mechanism is introduced, so that searching performance of the algorithm is improved.

After the set total generation number of the population evolution and the number of searching times for local search of each generation of the population are completed, the obtained individuals in the population are convergent to the optimal solution, and then all the individuals in the population are approximately equal. Therefore, the optimal individual (the individual with the minimum fitness value) in the population may be taken as a globally optimal solution obtained in the algorithm.

Further, the first update unit 22 comprises a calculation subunit 221 and a set generation subunit 222.

The calculation subunit 221 is used for calculating a fitness value of each individual in the population P(b) by combining the fertilization precision control model, and calculating mean parameters and variance parameters of the estimation of distribution algorithms according to the fitness values. Specifically, a calculation formula of the fitness value is $\max|f_t(x)-\text{Set}|$, a calculation formula of the mean parameters $x_i$, $x_i$ is the mean of individuals of which the fitness values rank at top 50% in the population in the $i^{th}$ dimension, and the variance parameters are variances obtained by calculation.

The set generation subunit 222 is used for sampling through the Gauss distribution algorithm by combining the mean parameters and the variance parameters, and generating a set composed of N individuals. Herein, sampling is performed in a random manner, so that distribution of a set obtained by sampling satisfies Gaussian distribution. Additionally, since the solution adopted in the present invention is in a state 0-1, the obtained sampling individual values should be rounded off to become to 0 or 1 and then to form a set; and through the above manner, the population is ensured to evolve into an optimal solution in an evolution process.

Further, the second update unit 23 is used for respectively performing mutation operation on the value of each individual in the set. The mutation operation herein is to change the selected value $x_n$ in the individuals of the set, i.e., to vary the value $x_n$; if the value $x_n$ is 1, the value is changed to 0, and if the value $x_n$ is 0, the value is changed to 1. Herein, the values of the selected individuals are random and unidirectional when the values of the individuals are subjected to the mutation operations, so that the population is diversified. The individuals before mutation are replaced with individuals generated by mutation so as to generate a population P(b) of the next generation if the fitness values of the individuals generated by mutation are better than the fitness values of the individuals before mutation; it is set that b=b+1, q=0. Herein, the fitness values of the individuals generated by mutation are better than the fitness values of the individuals before mutation, which means that the fitness values of the individuals generated by mutation are less than the fitness values of the fitness values of the individuals before mutation.

The present invention has beneficial effects as follows: the estimation of distribution algorithms are combined with the fertilization precision control model of the water and fertilizer integrated equipment, thereby solving an optimal control process of enhancing control precision of the water and fertilizer integrated equipment; and compared with time control and PID control, the method proposed by the present invention enhances the control precision of the equipment in a whole-process control manner while fully considering the influences caused by system structure delay, so that precision control of the fertilization concentration in the water and fertilizer integrated equipment is enhanced, and the performance of the water and fertilizer integrated equipment is improved.

The above only describes preferred embodiments of the present invention, rather than limits the present invention. All modifications, equivalent replacements, improvements and the like made within spirit and principles of the present invention should be included in a protection scope of the present invention.

We claim:

1. A fertilization precision control method for a water and fertilizer integrated apparatus, comprising the following steps:

S1: establishing a fertilization precision control model of the water and fertilizer integrated apparatus; and S2: obtaining an optimal solution of the fertilization precision control model by adopting estimation of distribution algorithms for the water and fertilizer integrated apparatus, thereby improving control precision of water and fertilizer integration of the water and fertilizer integrated apparatus, wherein a specific implementation mode of the step S1 is as follows:

step S11: monitoring fertilizer solution concentration values and corresponding time values of a fertilizer of the water and fertilizer integrated apparatus by a structure and concentration monitoring sensor, and collecting fertilizer solution concentration values and corresponding time values of the fertilizer thereof in a fertilizer mixing bucket in real time;

step S12: generating a fertilizer solution concentration varying curve by fitting the collected fertilizer solution concentration values and the corresponding time values thereof into with a least square method; and step S13: establishing a fertilization precision control model of the water and fertilizer integrated apparatus according to the fertilizer solution concentration varying curve:

$$\begin{cases} f_t(x) = \begin{cases} U_{t-td}(x) + R_t & s = 1 \\ L_{t-td}(x) + R_t & s = 0 \end{cases} \\ \min\{\max\{f_t(x) - \text{Set}\}\} \quad t = 1, 2, 3, \ldots n \end{cases}$$

wherein $f_t(x)$ is the fertilizer solution concentration varying curve of the water and fertilizer integrated apparatus, $U_{t-td}(x)$ is a varying curve when the fertilizer solution concentration is increased, $L_{t-td}(x)$ is a varying curve when the fertilizer solution concentration is decreased, x is a fertilizer solution concentration, t is a time sequence number, td is delay time of the structure and concentration monitoring sensor, $R_t$ is a random concentration fluctuation value, S represents whether a fertilization channel of the water and fertilizer integrated apparatus is opened or not, "S=1" represents that the fertilization channel of the water and fertilizer integrated apparatus is opened, "S=0" represents that the fertilization channel of the water and fertilizer integrated apparatus is closed, and Set represents a set fertilizer solution concentration value to be achieved, wherein a specific implementation mode of the step S2 is as follows:

step S21: determining a solution of the fertilization precision control model to be $X=[x_1, x_2, x_3, \ldots, x_n]$, wherein X is a set which is composed of N individuals, $x_n$ is an opening or closing state of a fertilizer absorption channel at $n^{th}$ second and the set parameters of the estimation of distribution algorithms are as follows: a scale of population is N, a total generation number of population evolution is m and a number of searching times for local search of each generation of the population is a; setting b=0; and generating N individuals in a random manner to form an initial population P(b) under a condition that a non-negativity constraint of variables is met;

step S22: calculating a fitness value of each individual in the population P(b) by combining the fertilization precision control model, and sampling by adopting a Gauss distribution algorithm to generate a set which is composed of N individuals;

step S23: performing mutation operations on values of the individuals in the set, and generating a population P(b) of a next generation composed of N individuals, and setting b=b+1, q=0;

step S24: performing local search on each of the individuals in the population P(b), and generating a population P(b) of a third generation composed of N individuals, and setting q=q+1;

step S25: returning to the S24 if q is less than a, otherwise entering step S26; and step S26: returning to the S22 if b is less than m, otherwise outputting an optimal individual, as an optimal solution, in the population P(b) of the third generation; and controlling opening or closing of the fertilizer absorption channel according to the optimal solution, thereby controlling a fertilizer concentration in the fertilizer mixing bucket and enhancing a precision control of the fertilization concentration in the water and fertilizer integrated equipment.

2. The fertilization precision control method for the water and fertilizer integrated apparatus according to claim 1, wherein a specific implementation mode of the step S22 is as follows:

step S221: calculating a fitness value of each individual in the population P(b) by combining the fertilization precision control model, and calculating mean parameters and variance parameters of the estimation of distribution algorithms according to the fitness values; and step S222: sampling through the Gauss distribution algorithm by combining the mean parameters and the variance parameters, and generating a set which is composed of N individuals.

3. The fertilization precision control method for the water and fertilizer integrated apparatus according to claim 2, wherein a specific implementation mode of the step S23 is as follows:

respectively performing mutation operations on the value of each individual in the set, and replacing the individuals before mutation with individuals generated by mutation so as to generate a population P(b) of the next generation if the fitness values of the individuals generated by mutation are better than the fitness values of the individuals before mutation; and setting b=b+1, q=0.

* * * * *